United States Patent [19]

Senso

[11] Patent Number: 4,672,595
[45] Date of Patent: Jun. 9, 1987

[54] SYSTEM FOR CONTROLLING ROTARY DRIVE OF RECORDED DISK PLAYER

[75] Inventor: Hitoshi Senso, Saitama, Japan

[73] Assignee: Pioneer Electronic Corporation, Tokyo, Japan

[21] Appl. No.: 713,115

[22] Filed: Mar. 18, 1985

[30] Foreign Application Priority Data

Mar. 16, 1984 [JP] Japan ................................. 59-51652

[51] Int. Cl.[4] ............................................ G11B 19/24
[52] U.S. Cl. ...................................... 369/50; 358/338
[58] Field of Search ........................... 369/50, 111, 59; 358/322, 338, 339, 342

[56] References Cited

U.S. PATENT DOCUMENTS

| 4,338,683 | 7/1982 | Furukawa et al. | 369/50 |
| 4,423,498 | 12/1983 | Kimura et al. | 369/50 |
| 4,546,461 | 10/1985 | Isobe | 369/50 |
| 4,550,347 | 10/1985 | Nakamuta | 358/338 |
| 4,575,835 | 3/1986 | Nishikawa et al. | 369/50 |

Primary Examiner—Donald McElheny, Jr.
Attorney, Agent, or Firm—Sughrue, Mion, Zinn, Macpeak & Seas

[57] ABSTRACT

A system for controlling the rotary drive of a disk player employing only inexpensive and simple circuits. A position pulse signal is generated of a frequency proportional to the radial distance of the pickup from a reference position, and a rotation pulse signal is produced having a frequency proportional to the speed of the motor. When the rotational pulse signal is generated, the pulses thereof are counted, and when the counted pulse number falls outside a predetermined range, a switch signal is produced in an active state. When the switch signal is in its inactive state, a first control signal, which is based on the signal output of the pickup, is supplied to a motor drive circuit, and when the switch signal is in the active state, a second control signal, based both on both the rotation pulse signal and the position pulse signal, is supplied to the motor drive circuit.

6 Claims, 8 Drawing Figures

SYSTEM FOR CONTROLLING ROTARY DRIVE OF RECORDED DISK PLAYER

BACKGROUND OF THE INVENTION

The present invention relates in general to a system for controlling the rotary drive of a player for recorded disks. More particularly, the invention relates to such a system for a player for video disks recorded with data at a substantially constant packing density.

FIG. 1 is a view of a typical conventional system for controlling the rotary drive of a video disk player. In the drawing, reference numeral 1 designates a CLV (Constant Linear Velocity) disk on which data is recorded in a spiral track using the constant linear velocity method. The disk 1 is driven by a spindle motor 2. A pickup 3 provided above the disk 1 reads the recorded information from the disk. A slider incorporated shift mechanism, no shown, is provided to shift the pickup 3 in a radial direction across the disk 1 as the disk 1 is rotated during reproduction.

The output signals from the pickup 3 are supplied to a signal processing circuit 4 for correction. The signal processing circuit 4 is connected at its output to a reproduced synchronizing signal extracting circuit 5. From the signals output from the signal processing circuit 4, the reproduced synchronizing signal extracting circuit 5 separates the reproduced synchronizing signals and supplies the same to a control signal generating circuit 6. The control signal generating circuit 6 may, for example, be of the type capable of comparing a reproduced synchronizing signal with a reference synchronizing signal and generating a control signal indicative of the result of such comparison. The control signal generating circuit 6 is connected at its output to a drive circuit 8 for driving the motor 2 via a selector switch 7.

A position detector 9 detects the position of the pickup 3 and generates a position signal of a level proportional to the distance through which the pickup 3 has moved from a reference position. The output of the position detector 9 is applied to a divider 10. The divider 10 is connected at its output to the input of a reference voltage generating circuit 11. This reference voltage generating circuit 11 may be composed of, for example, a potential divider which divides the voltage output from the divider 10 and which has three output terminals, each outputting a different voltage magnitude, that is, a first output terminal outputs a voltage level $V_a$, a second output terminal outputs a voltage level $V_b$, and a third terminal a voltage level $V_c$, wherein $V_b < V_a < V_c$. The first output terminal is connected to a differential amplifier 31 via its negative input terminal. The second output terminal is connected to one input terminal of a comparator 32, and the third output terminal is connected to one input terminal of a comparator 33. Also, a rotary pulse generator 13 is connected to the driving shaft of the motor 2. The pulse generator 13 generates a pulse signal of a frequency proportional to the speed of the motor 2. The pulse generator 13 is connected at its output to an F/V (Frequency/Voltage) converter 14. The voltage output from the F/V converter 14 is supplied to the differential amplifier 31 via its positive input and to the other inputs of the comparators 32 and 33.

The output signals of the comparators 32 and 33 are supplied to a OR gate 34, the output of which controls the position of selector switch 7. The selector switch 7, when in its normal position, passes signals output from the control signal generating circuit 6 to the drive circuit 8, and, in its actuated position, allows signals output from the differential amplifier 31 to be applied to the drive circuit 8.

In the prior art systems for controlling the rotary drive of recorded disks having such a construction, the output signal of the pickup 3 is converted by the signal processing circuit 4 to a desired signal form. From the signals output from the signal processing circuit 4, the reproduced synchronizing signal extracting circuit 5 separates out a synchronizing signal. Based on this synchronizing signal, the control signal generating circuit 6 generates a control signal. The control signal is then passed via the selector switch 7 to the drive circuit 8, which in turns determines the speed of the motor 2 using loop control. Such loop control is utilized when the data of the disk 1 is to be reproduced in a normal manner.

The position detector 9 outputs a voltage signal of magnitude corresponding to the distance through which the pickup 3 has been moved radially across the disk 1. The divider then converts the voltage output to a voltage magnitude representing the reciprocal of the pickup deflected distance.

If the angular speed of the disk to be read is $\omega$ at a particular point on the disk radially removed from the center thereof by a distance r, the relation of r and $\omega$ to the linear velocity v is expressed by $v = r \cdot \omega$. For a given value of linear velocity v, distance r is inversely proportional to angular speed $\omega$. Accordingly, the output voltage of the location detector 9 is proportional to the distance r, and thus the output voltage of the divider 10 is in proportion to $1/r$, that is, in proportion to speed $\omega$. The three voltages $V_a$, $V_b$ and $V_c$ produced by the reference voltage generating circuit 11 are based on the output voltage of the divider 10. Specifically, the voltages $V_a$, $V_b$ and $V_c$ are proportional to the output voltage of the divider 10, and decrease according as the pickup 3 moves closer to the outer circumference of the disk 1, as shown in FIG. 2. The voltage $V_a$ corresponds to the target speed (operating speed) of the motor 2 at a given deflected position of the pickup 3, the voltage $V_b$ corresponds to a lower limit speed smaller than the target speed, and $V_c$ corresponds a upper limit speed greater than the target speed.

The pulse signal output by the frequency generator 13 at a frequency proportional to the speed of the motor 2 is converted by the F/V converter 14 to a voltage signal of magnitude proportional to the frequency of the original pulse signal. The differential amplifier 31 outputs a voltage signal whose magnitude is proportional to the difference between the converted voltage from the converter and the voltage $V_a$. This converted voltage is also compared by the comparator 32 with the voltage $V_b$ and, when the converted voltage is smaller than $V_b$, the output level of the comparator 32 becomes high. Moreover, this converted voltage is compared by the comparator 33 with the voltage $V_c$ and, when the converted voltage is greater than $V_c$, the output level of the comparator 33 becomes high.

Since the output level of the comparator 32 is ORed with that of the comparator 33 by the OR gate 34, when the converted voltage is of a magnitude between $V_b$ and $V_c$, the output level of the OR gate 34 is low. Either when the converted voltage is smaller than $V_b$ or when it is greater than $V_c$, the output level of the OR gate 34 becomes high. When the output of the OR gate 34 is high, an actuating switch signal is supplied to the selector switch 7. Thus, the selector switch 7 is actuated so that the drive circuit 8 is connected to the output of the differential amplifier 31 instead of the output signal of the control signal generating circuit 6. Hence, the speed of the motor 2 is loop controlled. This loop control is used when the motor 2 is being started, when a search mode is entered, or when controlled movement of the pickup 3 due to loss of the reproduced signal is to be prevented.

However, these conventional systems for controlling the rotary drive of a disk player require the use of an expensive divider of complicated circuit construction. Another problem is that, since the F/V converter is required to have a certain high degree of conversion precision, the overall system circuitry is complicated and expensive.

SUMMARY OF THE INVENTION

A primary object of the present invention is to provide a system for controlling the rotary drive of a recorded disk player, which system can be manufactured at low cost, wherein expensive dividers and F/V converters are eliminated.

A system for controlling the rotary drive of a recorded disk player constructed in accordance with the present invention generates a position pulse signal of a frequency proportional to the detected position signal output from position detecting means. Further, the system generates a rotation pulse signal of frequency proportional to the speed of the motor. Upon the generation of this rotation pulse signal, the number of pulses is counted by the position detector means. When the counted pulse number falls outside a range between a first predetermined value and a second predetermined value, the system sets a switch signal in an active state. While the switch signal output is in its inactive state, a first control signal, which is an output based on the signal output of a pickup, is supplied to a motor drive circuit. On the other hand, when the switch signal is in the active state, a second control signal, which is based on both the rotation pulse signal and the position pulse signal, is supplied to the motor drive circuit.

DESCRIPTION OF THE PREFERRED EMBODIMENTS

Figure 1:
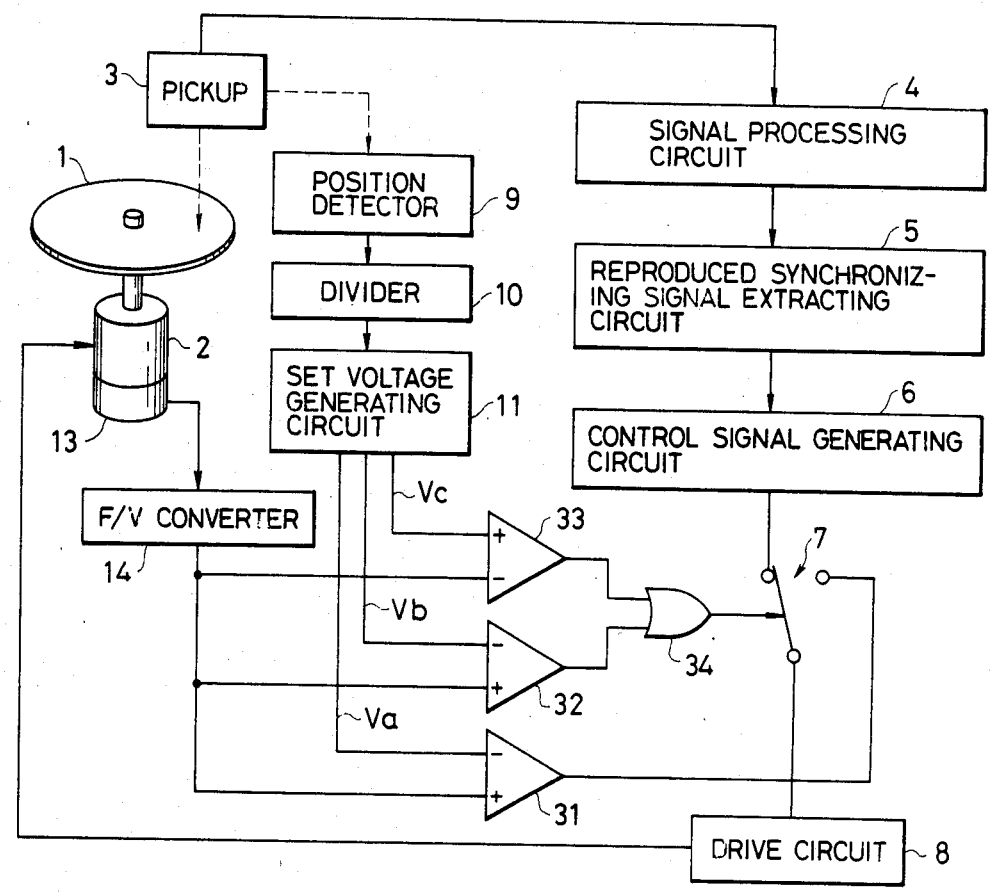
FIG. 1 is a block diagram showing a conventional system for controlling the rotary drive of a recorded disk.
Figure 2:
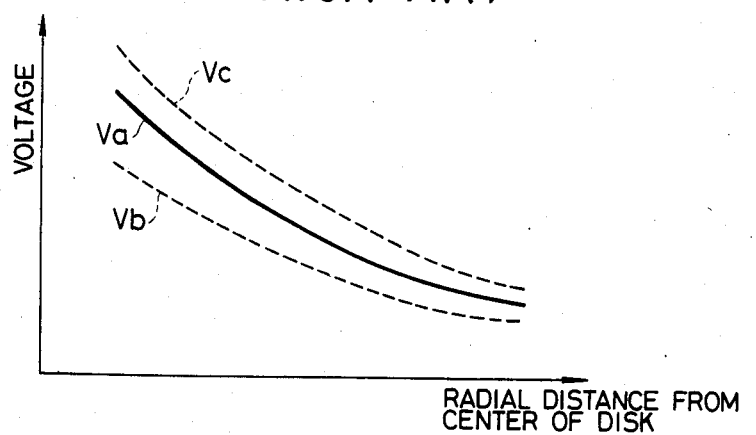
FIG. 2 is a diagram showing operation of the set voltage generating circuit of the system of FIG. 1.
Figure 3:
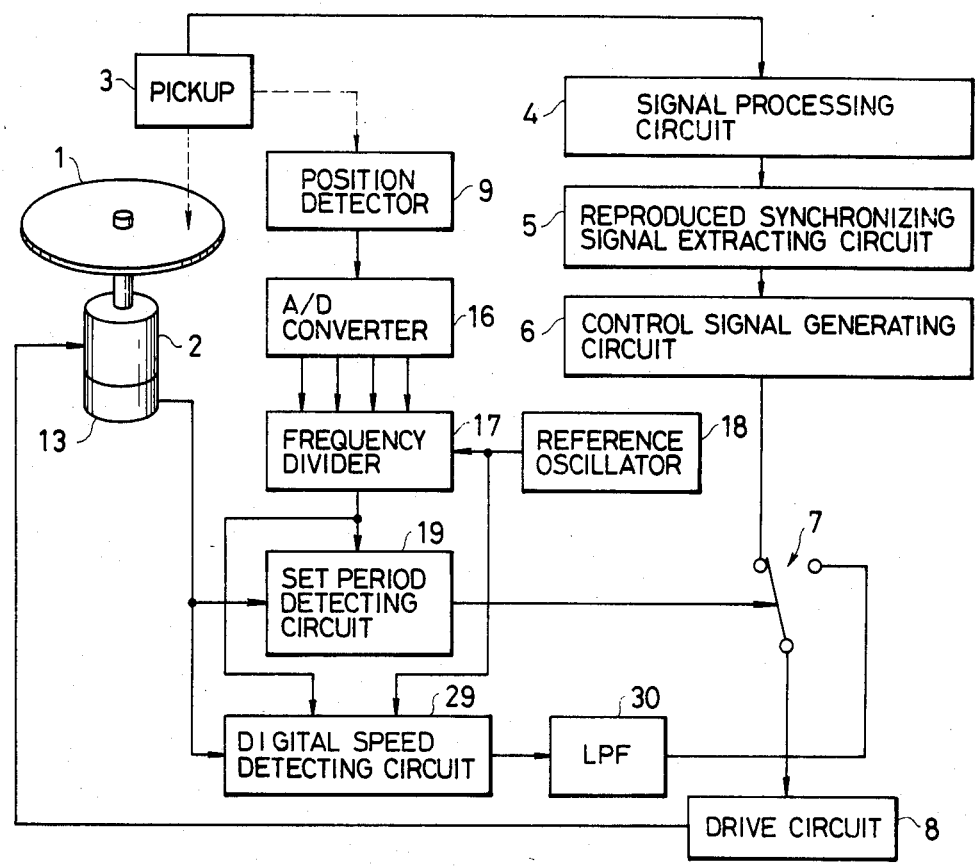
FIG. 3 is a block diagram showing a preferred embodiment of a rotary drive control system of the present invention.

A preferred embodiment of the present invention will be described in conjunction with FIGS. 3 through 6. In FIG. 3, like elements are designated by like reference numerals in FIG. 1.

A position detector 9 is connected at its output to a frequency divider 17 via an A/D (Analog/Digital) converter 16. The frequency divider 17 divides clock pulses output from a reference oscillator 18 by a dividing factor proportional to the output digital value of the A/D converter 16. Also, a detecting circuit 19 for detecting set periods is connected to a rotational pulse generator 13 at its output.

Figure 4:
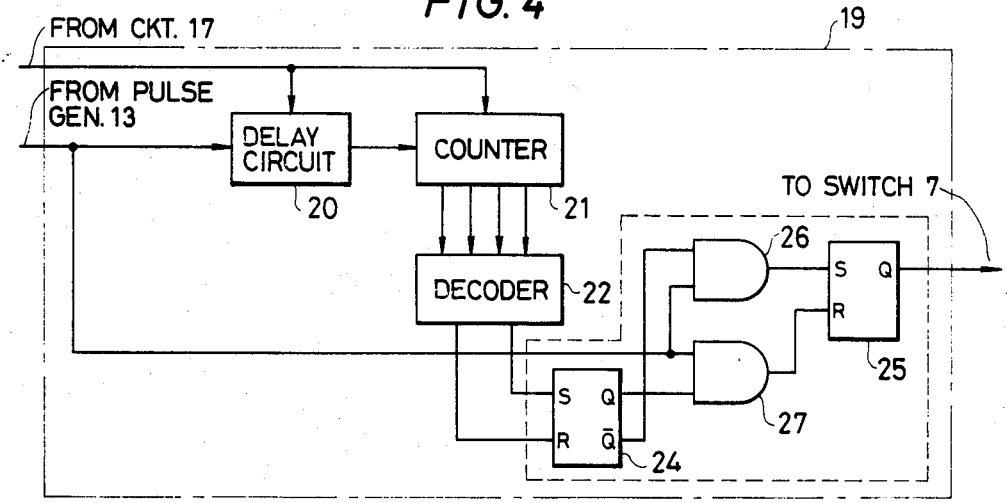
FIG. 4 is a block diagram showing the detailed construction of the set period detection circuit in the system of FIG. 3.

As illustrated in FIG. 4, the set period detecting circuit 19 includes: a delay circuit 20 composed of a shift register which delays for a predetermined clock time, that is, for a predetermined number of bit periods, the rotational pulse output from the pulse generator 13, the rotation pulse output being clocked with a divided pulse output from the frequency divider 17; a counter 21 which counts the divided pulses upon the rise of pulses generated by the delay circuit 20; a decoder 22 which generates a first set signal when the number of pulses counted by the counter 21 reaches a first predetermined value and a second set signal when the counted pulse number reaches a second predetermined value; and a set frequency detection gate circuit 23 which generates a switch signal in an active state upon detection of rotational pulses except during the period between the occurrence of a first set signal and a second set signal. This switch signal is supplied to a selector switch 7. The set frequency detection gate circuit 23 is composed of a pair of RS flip-flops 24 and 25 and a pair of AND gates 26 and 27.

The frequency divider 17 and the frequency 13 are connected at their outputs to a digital speed detecting circuit 29 which detects the speed of a disk 1. The output signal of the digital speed detecting circuit 29 is supplied to the selector switch 7 via an LPF (Low-Pass Filter) 30. The selector switch 7 in its normal position passes control signals output from the control signal generating circuit 6 to the drive circuit 8, and passes signals output from the LPF 30 to the drive circuit 8 when the switch signal is in its active state.

In accordance with the embodiment of the present invention having the above-mentioned construction, the position detector 9 supplies to the A/D converter 16 a voltage signal whose magnitude corresponds to the distance through which the pickup 3 is deflected radially across the face of the disk 1. The A/D converter 16 converts the voltage signal output from the position detector 9 to a digital value. This digital value determines the dividing factor by which the frequency divider 17 divides a clock pulse signal, at a frequency $f_{CKO}$ and output by the reference oscillator 18, to produce a divided pulse signal with a frequency of $f_{CKF}$, as shown by waveform (c) of FIG. 5. The period of this divided pulse signal is proportional to the deflected distance of the pickup 3.

Figure 5:
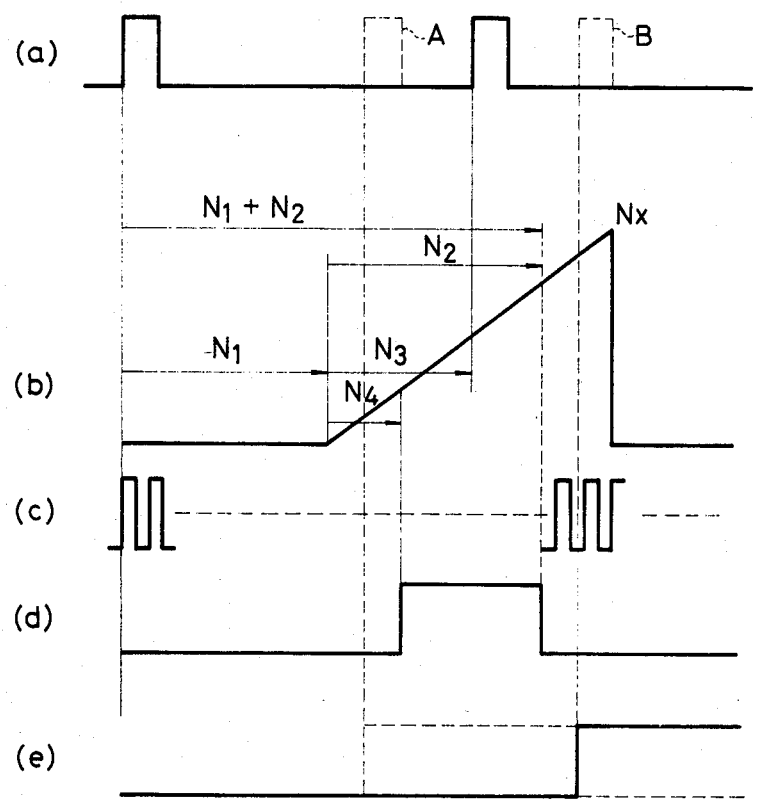
FIG. 5, consisting of (a)-(e), is waveform diagram used for explaining the operation of the system of FIG. 3.

Further, when the rotational pulse generator 13 outputs a pulse, the latter cause the delay circuit 20 to delay the divided pulse signal for a predetermined pulse time N, and the delayed pulse signal is supplied to the counter 21, as shown by waveform (a) of FIG. 5. A pulse thus output from the delay circuit 20 triggers the counter 21 to start counting the divided pulses. Waveform (b) of FIG. 5 shows the counted pulse number converted to analog form for clarity of illustration. When the number of pulses counted by the counter 21 reaches the first predetermined value $N_4$, the decoder 22 generates a first set signal. When the pulses counted by the counter 21 increase to reach the second predetermined value $N_2$, the decoder 22 generates a second set signal. These first and second set signals are supplied to the set frequency detection gate circuit 23. The counter 21 automatically resets upon incrementing to $N_x$.

The set frequency detection gate circuit 23 sets the flip-flop 24 upon receiving a first set signal, causing its output terminal Q to become high, as shown by waveform (d) of FIG. 5, the resets the flip-flop 24 upon receiving a second set signal, causing its output terminal Q to become low. During the time the output terminal of the flip-flop is high, a gate pulse is generated. While this gate pulse is present, if, for example, a rotation pulse is supplied, the output level of the AND gate 27 becomes high, resetting the flip-flop 25, whereupon the output terminal Q of the flip-flop 25, which is the output terminal of the set frequency detection gate circuit 23, becomes low. On the other hand, if no rotation pulse is supplied while there is no gate pulse, as represented by broken lines A and B superposed on waveform in FIG. 5, the output level of the AND gate 26 becomes high, setting the flip-flop 25 so that the output terminal Q of the flip-flop 25 goes high. This high output from the flip-flop 25 activates the switch 7. Accordingly, the output signal of the LPF 30, instead of the control signal output from the signal generating circuit 6, is supplied as a second control signal to the drive circuit 8 to control the speed of the motor 2.

For operation of the system for controlling the rotary drive of the present invention described above, periods $(N_1+N_4)/f_{CKF}$ and $(N_1+N_2)/f_{CKF}$, equal to the reciprocals of upper and lower limits on the rate of rotation with respect to the target rate of rotation of the motor 2, are set. For a given pulse number $N_1$ or $N_4$ as counted by the counter 21, since the frequency $f_{CKF}$ of a frequency-divided pulse is in inverse proportion to the deflected distance of the pickup 3, each of the aforesaid set periods is proportional to the pickup's deflected distance. When the period of the rotation pulse signal is greater than period $(N_1+N_2)/f_{CKF}$, such as in the event of uncontrolled pickup action, activation of the switch signal occurs in the above-described manner. When the period of the rotation pulse signal is less than the period $(N_1+N_4)/f_{CKF}$, activation of the switch signal occurs, indicating the rise time of a rotation pulse.

Figure 6:
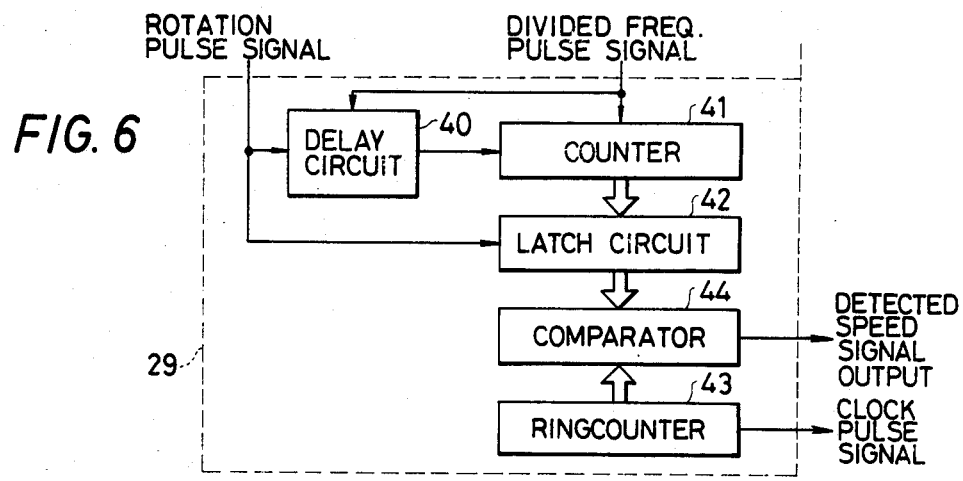
FIG. 6 is a block diagram showing the detailed construction of the digital speed detection circuit in the system of FIG. 3.

The digital speed detecting circuit 29 may, for example, be implemented with a delay circuit 40 composed of a shift register which effects a delay of a predetermined period based on frequency-divided pulse rotation pulses output from the frequency detector 13, a counter 41 which starts counting the divided frequency pulses in response to a pulse output from the delay circuit 40, a latch circuit 42 which latches the pulse number counted by the counter 41 in response to a rotation pulse, a ring counter 13 which counts the clock pulses output from the reference oscillator 18, and a comparator 44 which compares the value output from the ring counter 43 with the value output from the latch circuit 43, as illustrated in FIG. 6. The compared output of the comparator 44 is an output modified in pulse width.

Figure 7:
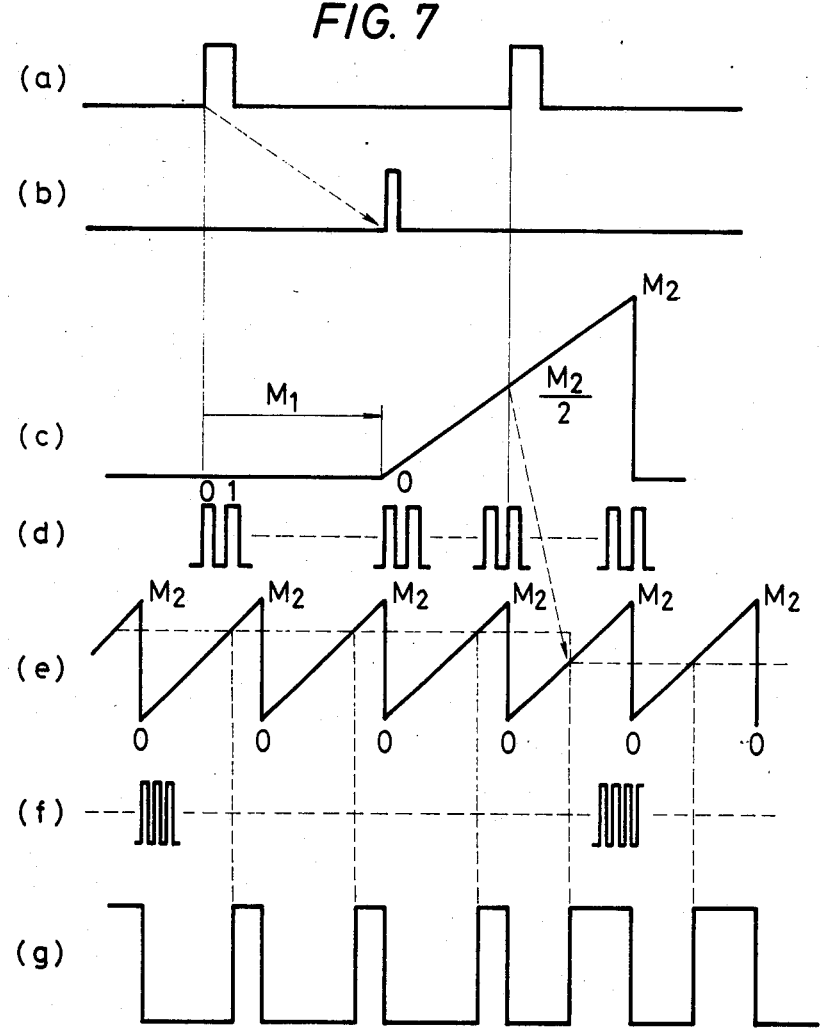
FIG. 7, consisting of (a)-(g), is a waveform diagram used for explaining the operation of the circuit of FIG. 6.

With the above-described arrangement, the delay circuit 40, upon receiving at its input a rotation pulse waveform (waveform (a) of FIG. 7), begins counting frequency-divided pulses starting with an initially input pulse until the count reaches a number $M_1$, and, when this number is reached, outputs a shift pulse, as shown by waveform (b) of FIG. 7. In response to this shift pulse, the counter 41 begins counting frequency-divided pulses until $M_2$ is reached. The pulse number thus counted is shown, converted for clarity of illustration into analog form, by waveform (c) of FIG. 7. The counted number of pulses output from the counter 41 is latched by the latch circuit 42 in response to a rotation pulse.

The ring counter 43 repeats counting clock pulses output from the reference oscillator 18, as shown by waveform (f) of FIG. 7, until the counted number reaches $M_2$, as in the case of the counter 41. Waveform (e) of FIG. 7 represents this count in analog form. The valve output from the ring counter 43 is compared with the valve output from the latch circuit 42 by the comparator 44. When the output value of the latch circuit 42 is greater than that of the ring counter 43, the comparator 44 generates a low-level output and, when the converse is true, the comparator generates a high level output. Consequently, when the disk 1 is rotating at a high speed, while the counter 41 produces a low value, the pulses output from the comparator 44 become low for a shorter period, as shown by waveform (g) of FIG. 7. On the other hand, when the disk 1 has a low rate of rotation, while the counter 41 produces a high value, the pulses output from the comparator 44 have a longer period at the high level. Output signals from the comparator 44 are converted by the LPF 30 to a DC signal and supplied to the selector switch 7.

Figure 8:
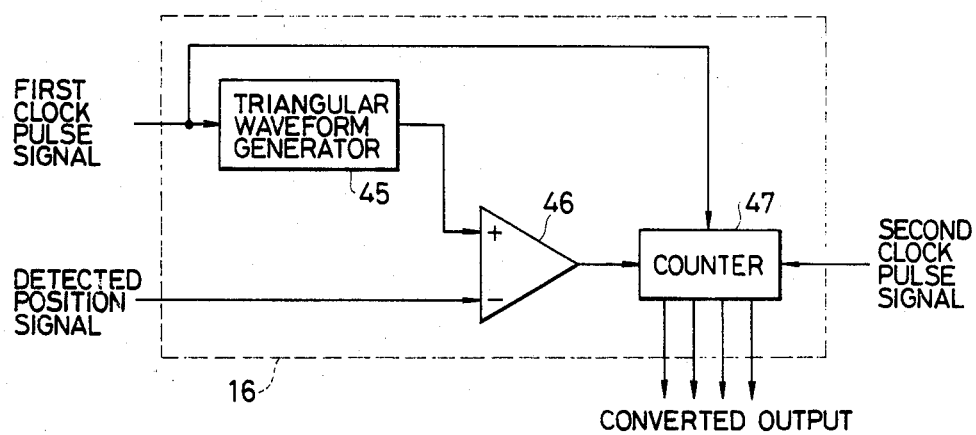
FIG. 8 is a block diagram showing the detailed construction of an A/D converter used in the system of FIG. 3.

FIG. 8 illustrates an example of the construction of the A/D converter 16. Referring to this figure, a triangular pulse generator 45 generates a triangular waveform signal in response to pulses of a first clock pulse signal of frequency $f_{CK1}$. This triangular waveform signal is supplied to a comparator 46, which compares it with a detected position signal output from the position detector 9. The first clock pulse signal is also supplied to the counter 47. The counter 47, upon receiving a pulse of the first clock pulse signal, begins counting pulses of the second clock pulse signal of frequency $f_{CK2}$. This counting operation is stopped in response to a high level output from the comparator 46. The count of the counter 47 is output as a digital signal. The frequencies $f_{CK1}$ and $f_{CK2}$ may be independently determined. The frequency $f_{CK1}$ is a sampling frequency and the frequency $f_{CK2}$ determines the resolution.

In the above-described embodiment of the invention, the set period detecting circuit 19 is constructed as a separate component from the digital speed detecting circuit 29. However, a partially merged circuitry construction may be used by connecting the output of the counter 41 in the digital speed detection circuit 29 to the decoder 22 of the set period detecting circuit 19.

In the above-described embodiment, the output of the position detector 9 for the pickup 3 is a voltage signal. However, in an alternative construction, the position detector 9 may be replaced by a count-up/count-down counter, eliminating the need of an analog-to-digital converter at the later stage. Such a system is more simplified in construction.

In addition, in the described embodiment, the disk may be rotated while the switch signal is active. However, this is a matter of choice, and rotation may be stopped by the switch signal.

Still further, the description above is limited to the case of a CLV disk. However, the present invention is also applicable to so-called CAA (Constant Angular Acceleration) disks in which the data is recorded with a constantly varying angular velocity. In other words, the present invention is applicable to disks on which the data is recorded at a constant packing density.

As explained above, in the system for controlling the rotary speed of a recorded disk player in accordance with the present invention, a position pulse signal is generated of period proportional to the detected position signal output from the position detector for detecting the position of the pickup. A rotation pulse signal is also generated of frequency proportional to the speed of the motor. The number of position pulses is counted starting upon the generation of a rotation pulse, and when the counted pulse number falls outside a range between a first predetermined value and a second predetermined value, a switch signal is activated if there is a rotation pulse still present. When this switch signal is not active, a first control signal, which is based on an output signal from the pickup, is supplied to a drive circuit. When the switch signal is active, a second control signal, which is based, not on the output signal from the pickup, but on both a position pulse signal and a rotation pulse signal, is supplied to the drive circuit. Consequently, the present invention does not require an expensive divider of complicated circuit structure or high-performance F/V converter, which are essential to prior art devices. Therefore, the invention provides a system for controlling the rotary speed of recorded disks which is simple in circuit structure and inexpensive.

I claim:

1. A system for controlling a rotary drive of a recorded disk player for disks recorded with a constant packing density, comprising: a pickup for reading contents of a recorded disk; position detecting means for producing a position signal indicative of a distance through which said pickup is radially moved over a surface of said disk with respect to a reference point; first pulse signal generating means for generating a position pulse signal of a frequency proportional to said position signal; a motor for rotating a recorded disk; second pulse signal generating means for generating a rotation pulse signal of a frequency proportional to a speed of said motor; switch signal generating means for counting a number of position pulses generated by said first pulse signal generating means starting upon generation of a pulse of said rotation pulse signal and generating a switch signal in an active state if the counted pulse number falls outside a range between a first predetermined value and a second predetermined value; first control signal generating means for generating a first control signal in response to an output signal from said pickup for controlling the speed of said motor; second control signal generating means for generating a second control signal in response to both said position pulse signal and said rotation pulse signal for controlling the speed of said motor; means for driving said motor in response to a drive signal; and switch means which is responsive to said switch signal, for supplying to said motor as said drive signal said first control signal when said switch signal is in an inactive state and said second control signal when said switch signal is in said active state.

2. The system for controlling a rotary drive of a recorded disk player of claim 1, wherein said position signal is in analog form, and wherein said first pulse signal generating means comprises: an analog-to-digital converter for converting said analog position signal to digital form; a reference signal oscillator; and a frequency divider to produce said position pulse signal by dividing in frequency an output signal of said reference oscillator by a value at an output of said analog-to-digital converter.

3. The system for controlling a rotary drive of a recorded disk player of claim 2, wherein said second pulse signal generating means comprises a rotary pulse generator coupled to said motor for producing said rotation pulse signal at a frequency indicative of a rotational speed of said motor.

4. The system for controlling a rotary drive of a recorded disk player of claim 3, wherein said second control signal generating means comprises: a first delay circuit receiving an output of said rotary pulse generator for delaying said pulse signal by an amount determined by a frequency of an output of said frequency divider; a first counter for counting pulses of said output of said frequency divider, said first counter being reset by an output of said first delay circuit; a latch circuit for storing an output of said first counter in response to a pulse of said output of said rotary pulse generator; a ring counter clocked by said output signal of said reference signal oscillator; and a comparator for comparing a value stored in said latch circuit with an output of said ring counter, and producing said second control signal.

5. The system for controlling a rotary disk of a recorded disk player of claim 4, wherein said switch signal generating means comprises: a second delay circuit clocked by said output of said frequency divider; a second counter, said second counter being clocked by said output of said frequency divider and being reset by an output of said second delay circuit; decoder means for generating a first set signal when an output of said second counter reaches a first predetermined value and a second set signal when said output of said second counter reaches a second predetermined value; and a set frequency detection gate circuit for producing said switch signal in said active state upon detection of output pulses from said rotary pulse generator except during a period between the occurrence of said first set signal and the occurrence of said second set signal.

6. The system for controlling a rotary drive of a recorded disk player of claim 5, wherein said set frequency detection gate circuit comprises: a first flip-flop receiving as inputs said first and second set signals for determining an output state thereof; first and second AND gates each having a first input receiving said output of said second pulse signal generating means , said first AND gate having a second input receiving a noninverted output of said first flip-flop, and said second AND gate having a second input receiving an inverted output of said first flip-flop; and a second flip-flop having a first input coupled to an output of said first AND gate and a second input coupled to an output of said second AND gate for determining an output state thereof, said switch signal being produced on an output of said second flip-flop.

* * * * *